US011266142B1

(12) United States Patent
Bishop

(10) Patent No.: US 11,266,142 B1
(45) Date of Patent: Mar. 8, 2022

(54) METHOD AND APPARATUS FOR EXCLUDING RODENTS AND OTHER ANIMALS FROM A STRUCTURE

(71) Applicant: Jeremy Cooper Bishop, Waleska, GA (US)

(72) Inventor: Jeremy Cooper Bishop, Waleska, GA (US)

( * ) Notice: Subject to any disclaimer, the term of this patent is extended or adjusted under 35 U.S.C. 154(b) by 0 days.

(21) Appl. No.: 16/583,150

(22) Filed: Sep. 25, 2019

Related U.S. Application Data

(60) Provisional application No. 62/736,690, filed on Sep. 26, 2018.

(51) Int. Cl.
*A01M 29/30* (2011.01)
*E04D 13/15* (2006.01)

(52) U.S. Cl.
CPC ............. *A01M 29/30* (2013.01); *E04D 13/15* (2013.01)

(58) Field of Classification Search
USPC .......................................... 52/11, 12, 13, 15
See application file for complete search history.

(56) References Cited

U.S. PATENT DOCUMENTS

| | | | | |
|---|---|---|---|---|
| 3,100,951 A | * | 8/1963 | Hickman | E04D 13/155 52/96 |
| 3,137,970 A | * | 6/1964 | Tiernan | E04D 13/15 52/95 |
| 3,192,670 A | * | 7/1965 | Jones, III | E04D 13/15 52/95 |
| 3,254,460 A | * | 6/1966 | Bowser | E04D 13/15 52/94 |
| RE26,056 E | * | 7/1966 | Hickman | E04D 13/155 52/94 |
| 3,436,877 A | * | 4/1969 | Gunning | E04D 13/0459 52/11 |
| 3,533,201 A | * | 10/1970 | Tyler | E04D 13/155 52/60 |

(Continued)

OTHER PUBLICATIONS

This is a web page from Division 7 Supply, 1125 Samples Industrial Drive Cumming, GA 30041, listing a product as "Metal Flashings Roof Edge 1-½"x2-½" Galv. 120 Deg". This was printed from a URL located Aug. 17, 2020 at https://www.d7supply.com/product/metal-flashings-roof-edge-1-12-x-2-12-galv-120-deg/.

*Primary Examiner* — Joshua K Ihezie
(74) *Attorney, Agent, or Firm* — Gronholm Patent Services

(57) ABSTRACT

A Drip Edge Configuration (aka Rodent Proof Drip Edge System) is designed for residential use to cover the construction gap above the fascia to prevent rodent entry and to direct water into the gutters. The Drip Edge Configuration also comes with a Roof Return Configuration to seal the gap where the soffit meets the shingles. Finally, The Drip Edge Configuration also has the option for venting in the rare occasion where a house has no soffit or additional venting is required. An improved drip edge which includes holes in the fascia-facing face which allows the drip edge to be screwed from the face using screws with rubber washers for a water proof seal just as used on a metal roof for a rodent proof solution. An improved drip edge which includes also galvanized steel and is flexible enough to cut and bend for proper installation to have rodent proof inside and outside corners. A roof return configuration to seal the construction gap where the soffit meets the shingles.

9 Claims, 16 Drawing Sheets

(56) References Cited

U.S. PATENT DOCUMENTS

| | | | | |
|---|---|---|---|---|
| 4,254,594 A * | 3/1981 | Hammond | E04D 13/064 | 52/11 |
| 4,594,820 A * | 6/1986 | Render | E04D 13/15 | 52/60 |
| 4,909,006 A * | 3/1990 | Hickman | E04D 3/405 | 52/288.1 |
| 4,969,250 A * | 11/1990 | Hickman | E04D 3/405 | 228/142 |
| 5,328,406 A * | 7/1994 | Morris, Jr | E04D 13/178 | 454/260 |
| 5,586,414 A * | 12/1996 | Tawzer | E04D 5/14 | 52/199 |
| 5,613,339 A * | 3/1997 | Pollock | B63B 3/48 | 52/836 |
| 6,035,587 A * | 3/2000 | Dressier | E04D 13/0459 | 52/716.2 |
| 6,449,910 B1 * | 9/2002 | Budd | E04D 13/0459 | 52/302.6 |
| 6,780,099 B1 * | 8/2004 | Harper | E04D 3/352 | 454/185 |
| 8,069,619 B1 * | 12/2011 | Inzeo | E04D 13/152 | 52/95 |
| 8,281,521 B1 * | 10/2012 | Rasmussen | E04D 13/158 | 52/60 |
| 8,869,466 B2 * | 10/2014 | Garcia | E04F 19/00 | 52/96 |
| 9,127,451 B1 * | 9/2015 | Boor | E04F 13/22 | |
| 2004/0016201 A1 * | 1/2004 | Folkersen | E04D 11/02 | 52/741.4 |
| 2005/0005551 A1 * | 1/2005 | Graham | E04D 13/0459 | 52/415 |
| 2005/0193642 A1 * | 9/2005 | Brochu | E04D 13/158 | 52/58 |
| 2006/0016130 A1 * | 1/2006 | Lin | E04D 13/15 | 52/24 |
| 2007/0074466 A1 * | 4/2007 | Rasmussen | E04D 13/0459 | 52/97 |
| 2008/0010906 A1 * | 1/2008 | Brochu | E04D 13/076 | 52/12 |
| 2011/0049118 A1 * | 3/2011 | Nark | E04D 13/103 | 219/213 |
| 2012/0102849 A1 * | 5/2012 | Shugart | E04D 13/158 | 52/96 |
| 2013/0097943 A1 * | 4/2013 | Higginbotham | E04D 13/064 | 52/12 |
| 2014/0099877 A1 * | 4/2014 | Gassman | E04D 13/178 | 454/366 |
| 2015/0089883 A1 * | 4/2015 | Peck | E04D 13/076 | 52/12 |
| 2018/0223537 A1 * | 8/2018 | Bredeweg | E04D 13/0459 | |
| 2018/0347197 A1 * | 12/2018 | Folkersen | E04D 13/0459 | |
| 2021/0062512 A1 * | 3/2021 | Brochu | E04D 13/0685 | |

* cited by examiner

DRIP EDGE CONFIGURATION 10
(three different cross section of drip edge lengths 15)

ALL FIGURES OF OUTSIDE CORNER OF EDGE
LENGTHS 15 OF DRIP EDGE CONFIGURATION 10

INSIDE CORNER OF EDGE LENGTHS 15
OF DRIP EDGE CONFIGURATION 10
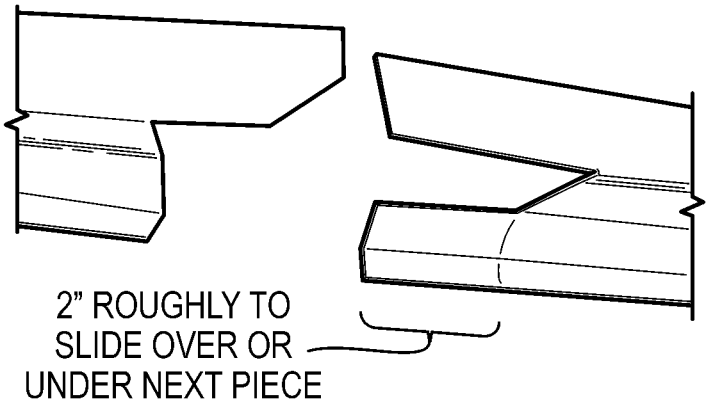
2" ROUGHLY TO
SLIDE OVER OR
UNDER NEXT PIECE
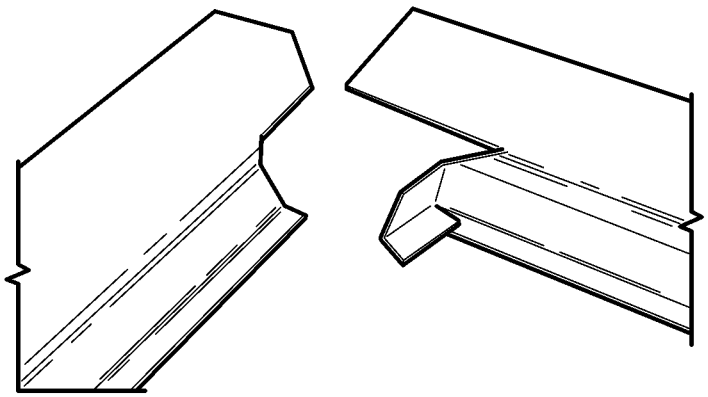
2" OVERHANG
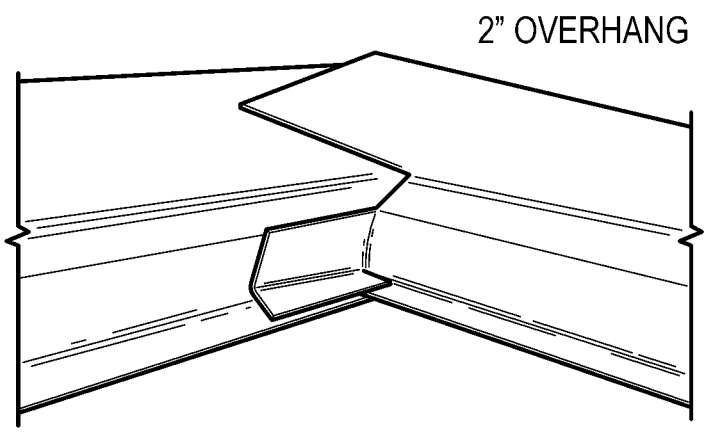
FIG. 10

GAP SHOWN WITHOUT RETURN SEAL IN PLACE

GAP COVERED; RETURN SEAL IN PLACE

RETURN SEAL IS INSTALLED OVER THE GAP SHOWN HERE TO PREVENT
WILDLIFE FROM ENTERING. IT SHOULD BE SCREWED TO THE SOFFET AND/
OR FASCIA WHILE USING SILICONE TO ADHERE TO THE SHINGLE

METHOD AND APPARATUS FOR EXCLUDING RODENTS AND OTHER ANIMALS FROM A STRUCTURE

CROSS-REFERENCE TO RELATED APPLICATION

The present application claims the full benefit and priority of provisional application No. 62/736,690 filed 2018 Sep. 26, and incorporates its entirety by reference.

FIELD

This disclosure relates to a method and apparatus for excluding rodents and other animals from a structure.

BACKGROUND

The present invention relates generally to excluding rodents and other animals from a structure.

SUMMARY

The present invention comprises various improved methods and apparatuses for excluding rodents and other animals from a structure. It provides a novel and unique way for accomplishing such goals which is not known by prior art devices or methods. It provides improved pest exclusion in a cost-effective manner while providing improved water exclusion features as well.

Under one aspect of the invention is provided a multi-component device for discouraging pest entry into a dwelling having a roof, the roof including a roof deck portion and a roof fascia portion, the roof deck portion and the roof fascia portion defining an elongate gap therebetween, the gap lying generally along an elongate horizontal axis; the device comprising: A) an elongate drip edge length having a substantially consistent transverse cross section, the drip edge length comprising: 1) an elongate substantially planar deck facing section, the deck facing section configured to have a portion of one primary planar surface facing a portion of the roof deck portion; 2) an elongate substantially planar overhanging section, the overhanging section extending from the deck facing section and configured to angle back from it; 3) an elongate substantially planar fascia facing section, the fascia facing section configured to have a portion of one primary planar surface facing a portion of the roof fascia portion; and 4) an elongate substantially planar drip edge section, the drip edge section configured to extend at an angle outward from the lower edge of the fascia facing section, and terminating in a free edge; and B) a fastener assembly, the fastener assembly including a portion passing through the fascia facing section and attaching the fascia facing section relative to the roof fascia portion, the elongate drip edge length covering the elongate gap and discouraging pests from accessing the elongate gap and entering therethrough.

Under another aspect of the invention is provided the device as noted above, wherein the elongate substantially planar fascia facing section includes pre-drilled holes to allow the fasteners to pass therethrough.

Under another aspect of the invention is provided the device as noted above, wherein the fastener assembly includes a metal screw with a flexible seal element around the metal shaft of the screw to keep water out.

Under another aspect of the invention is provided the device as noted above, wherein the flexible seal element of the fastener assembly is a rubber washer.

Under another aspect of the invention is provided the device as noted above, wherein the fastener assembly includes a metal screw with a flexible seal element around the metal shaft of the screw to keep water out.

Under another aspect of the invention is provided the device as noted above, wherein the flexible seal element of the fastener assembly is a rubber washer.

Under another aspect of the invention is provided the device as noted above, wherein the elongate drip edge length is made of galvanized sheet metal.

Under another aspect of the invention is provided the device as noted above, wherein the elongate drip edge length is bendable for inside or outside corners by use of cutting and folding.

Under another aspect of the invention is provided the device as noted above, wherein the bending is facilitated by severing a portion of the elongate substantially planar fascia facing section from the remainder of the elongate drip edge length and folding at least a portion of the remainder of the elongate drip length.

Under another aspect of the invention is provided the device as noted above, wherein the elongate drip edge length has the ability to fit over existing drip edges or over a fascia strip.

Under another aspect of the invention is provided a multi-component device for discouraging pest entry into a dwelling having a roof having at least two different roof segments each including a soffit and a fascia, the two segments having two corresponding deck surfaces, each lying in a different plane, the segments including a first roof segment including a first inclined roof deck portion having shingles thereon, the segments also including a second, "roof return", segment including a second inclined roof deck portion having shingles thereon and also including a corresponding fascia and soffit, the second, "roof return", segment configured such that it returns toward and is at an angle relative to the surface of the first inclined roof deck portion such that at least one of the fascia and soffit of the second segment terminates at a free edge so as to define a gap between the at least one of the fascia and soffit of the second segment and the shingles on the first segment, the device comprising: A) an elongate return length having a substantially consistent transverse cross section, the return length comprising: 1) a first substantially planer section; and 2) a second substantially planer section being at an angle relative to the first substantially planer section, B) a fastener; and C) a portion of adhesive, the fastener passing through first substantially planer section and attaching the first substantially planer section relative to the at least one of the fascia and soffit, the portion of adhesive attaching the second substantially planer section to the shingles on the first inclined roof deck portion, the elongate drip edge length covering the elongate gap and discouraging pests from accessing the gap and entering therethrough.

Under another aspect of the invention is provided the device as noted above, wherein the gap is between the fascia of the second segment and the shingles on the first segment, and the gap is covered by the elongate return length.

Under another aspect of the invention is provided the device as noted above, wherein the gap is between the soffit of the second segment and the shingles on the first segment, and the gap is covered by the elongate return length.

Under another aspect of the invention is provided the device as noted above, the gap is between both the soffit and the fascia of the second segment and the shingles on the first segment, and the gap is covered by the elongate return length.

Under another aspect of the invention is provided the device as noted above, wherein the fastener includes a metal screw with a flexible seal element around the metal shaft of the screw to keep water out.

Under another aspect of the invention is provided a multi-component device for discouraging pest entry into a dwelling having a roof, the roof including a roof deck portion and a roof fascia portion, the roof deck portion and the roof fascia portion defining an elongate gap therebetween, the gap lying generally along an elongate horizontal axis; the device comprising: A) an elongate drip edge length having a substantially consistent transverse cross section, the drip edge length comprising: 1) an elongate substantially planar deck facing section, the deck facing section configured to have a portion of one primary planar surface facing a portion of the roof deck portion; 2) an elongate substantially planar overhanging section, the overhanging section extending from the deck facing section and configured to angle back from it; 3) an elongate substantially planar fascia facing section, the fascia facing section configured to have a portion of one primary planar surface facing a portion of the roof fascia portion; and 4) an elongate substantially planar drip edge section, the drip edge section configured to extend at an angle outward from the lower edge of the fascia facing section, and terminating in a free edge; and B) a fastener assembly, the fastener assembly including a portion passing through the fascia facing section and attaching the fascia facing section relative to the roof fascia portion, the elongate drip edge length covering the elongate gap and discouraging pests from accessing the elongate gap and entering therethrough; C) an elongate ventilated drip edge length having a substantially consistent transverse cross section, the ventilated drip edge length comprising: 1) an elongate substantially planar deck facing section, the deck facing section configured to have a portion of one primary planar surface facing a portion of the roof deck portion; 2) an elongate substantially planar overhanging section, the overhanging section extending from the deck facing section and configured to angle back from it, the vented overhanging section configured to facilitate ventilation from the exterior of the house through the elongate gap; 3) an elongate substantially planar fascia facing section, the fascia facing section configured to have a portion of one primary planar surface facing a portion of the roof fascia portion; and 4) an elongate substantially planar drip edge section, the drip edge section configured to extend at an angle outward from the lower edge of the fascia facing section, and terminating in a free edge; and D) a fastener assembly, the fastener assembly including a portion passing through the elongate ventilated drip edge length and attaching the elongate ventilated drip edge length relative to the roof fascia portion.

Under another aspect of the invention is provided the device as noted above, wherein the fastener assembly includes a portion passing through the elongate ventilated drip edge length and attaching the elongate substantially planar fascia facing section of the elongate ventilated drip edge length relative to the roof fascia portion.

Under another aspect of the invention is provided the device as noted above, wherein the elongate drip edge length of section A is longer than the elongate ventilated drip edge length of section D.

These and other aspects will become readily apparent upon further review of the following specification and drawings. Other objects, features, and advantages of the present invention will become apparent upon reading the following detailed description of the preferred embodiment of the invention when taken in conjunction with the drawing and the appended claims.

BRIEF DESCRIPTION OF THE DRAWINGS

FIG. 9A shows two elements, a "first" element on the right and a "second" element on the left, with both elements being cut as shown. FIGS. 9B and 9C are just before final install configuration; as may be understood the "first" element on the right is installed first, and a "second" element on the left is then installed. At that point the protruding portions of the "first" element on the right are wrapped around as shown. To finish the "wrap" the deck facing section is fastened down from its slightly inclined shown position.

FIG. 10 shows the manner in which inside corners are covered with the Drip Edge Configuration 10.

FIG. 13A shows a gap underneath soffit 3 or fascia 7 of the roof and above flashing or roofing shingles. FIG. 13B shows a return seal in place, covering the gap that was shown in FIG. 13A. It should be understood that in this figure, the return seal is installed over the gap to prevent wildlife from entering. It should be screwed to the soffit and/or fascia, while silicone should be used a adhere to the shingles.

DETAILED DESCRIPTION

Introduction

The present invention now will be described more fully hereinafter with reference to the accompanying drawings, in which some, but not all embodiments of the inventions are shown. This invention may be embodied in many different forms and should not be construed as limited to the embodiments set forth herein; rather, these embodiments are provided so that this disclosure will satisfy applicable legal requirements. Like numbers refer to like elements throughout.

Reference is now made to the figures, in which like elements indicate like elements throughout the several views.

ELEMENT LIST

Here is a list of the various elements:
3 Roof Soffit (including a roof soffit portion)
4 Gutter
5 Conventional Drip Edge Configuration
6 Roof Deck (including a roof deck portion)
7 Roof Fascia (including a roof fascia portion)
8 Wildlife Company Modification
9 Fasteners
10 Applicant's Drip Edge Configuration
   15 Drip Edge Length
      20 Deck Facing Section
      30 Over Hanging Section
      40 Fascia Facing Section
      50 Drip Edge Section
   60 Fastener
65 Applicant's Vented Drip Edge Length
   67 Vented Overhanging Section
      68 Ventilation Holes
100 Applicant's Roof Return Seal Configuration
   102 Return length
      106 Shingle facing section (shorter leg in transverse cross section)
      107 Soffit facing section (longer leg in transverse cross section)
   104 Fastener (a screw with a rubber washer around the shaft of the screw is used to keep water out)
   106 Adhesive

DISCUSSION

General

Figure 1:
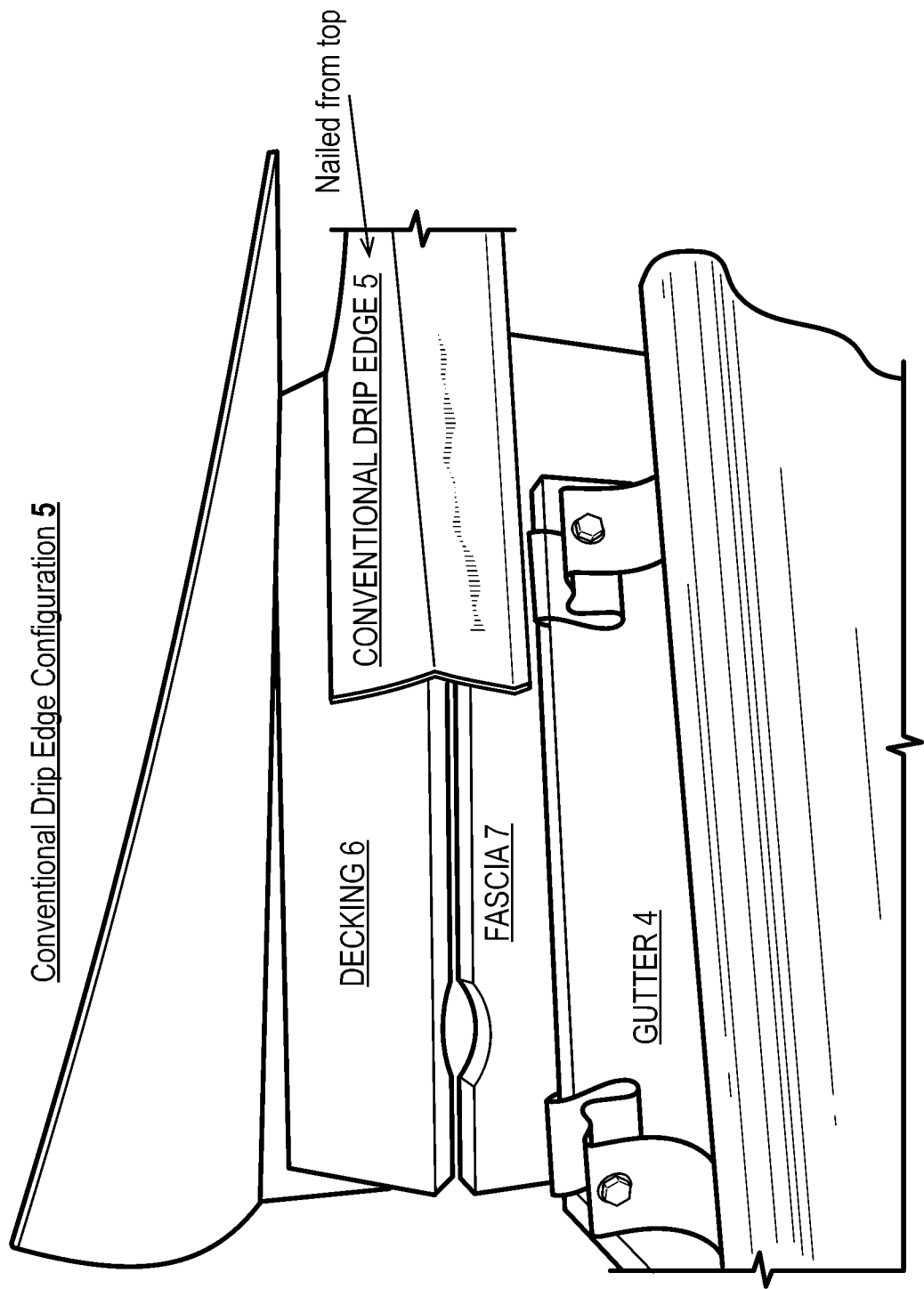
FIG. 1 shows a Conventional Drip Edge Configuration 5, which includes a drip edge length which is nailed from the top and is made of very thin aluminum. As may be understood, rodents may easily enter the home from under the lower ledge of the Conventional Drip Edge Configuration 5 or can simply chew directly through it as shown. Such a Conventional Drip Edge Configuration 5 leaves inside, outside and ends vulnerable to chew ins (see the hole chewed in the seam between the decking 6 and the fascia 7). A gutter 4 is also shown.

Roofers typically nail a drip edge from the top of the roof decking, which allows the drip edge to be easily passed through by rodents. Most drip edges are aluminum which rodents can easily chew through. An example is shown in FIG. 1, which shows a Conventional Drip Edge Configuration 5, which includes a drip edge which is nailed from the top and is made of very thin aluminum. As may be understood, rodents may easily enter the home from under the lower ledge of the Conventional Drip Edge Configuration 5 or can simply chew directly through it (see the hole chewed in the seam between the decking 6 and the fascia 7). A gutter 4 is also shown. Such a Conventional Drip Edge Configuration 5 leaves inside, outside and ends vulnerable to chew ins. There is also an elongate gap known as a "construction gap", which is the gap where the fascia meets the roof decking in many residential constructions. This is also a rodent entry point. This construction gap may be seen as elongate, with the gap lying generally along an elongate horizontal axis which is parallel to the adjacent free edges of the roof fascia and roof decking.

Figure 2:
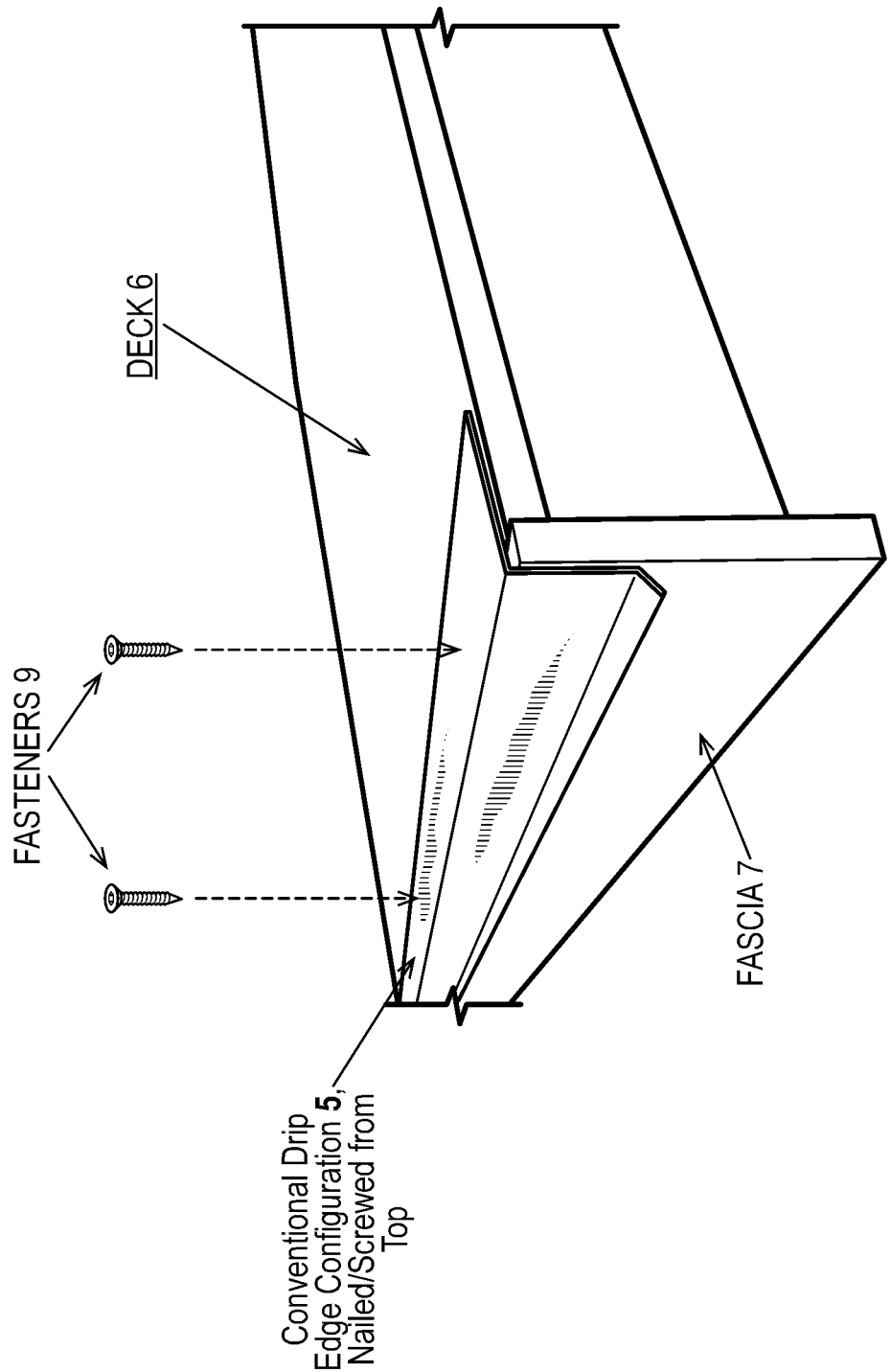
FIG. 2 is another drawing showing a Conventional Drip Edge Configuration 5, which is nailed/screwed from the top via fasteners 9 (screws in this case) and is made of very thin aluminum. In this drawing a gutter is not shown, but if installed correctly would be situated so that the drip edge drains into the gutter.

FIG. 2 is another drawing showing a Conventional Drip Edge Configuration 5, which is nailed from the top and is made of very thin aluminum. In this drawing a gutter is not shown, but if installed correctly would be situated so that the drip edge drains into the gutter.

Figure 3:
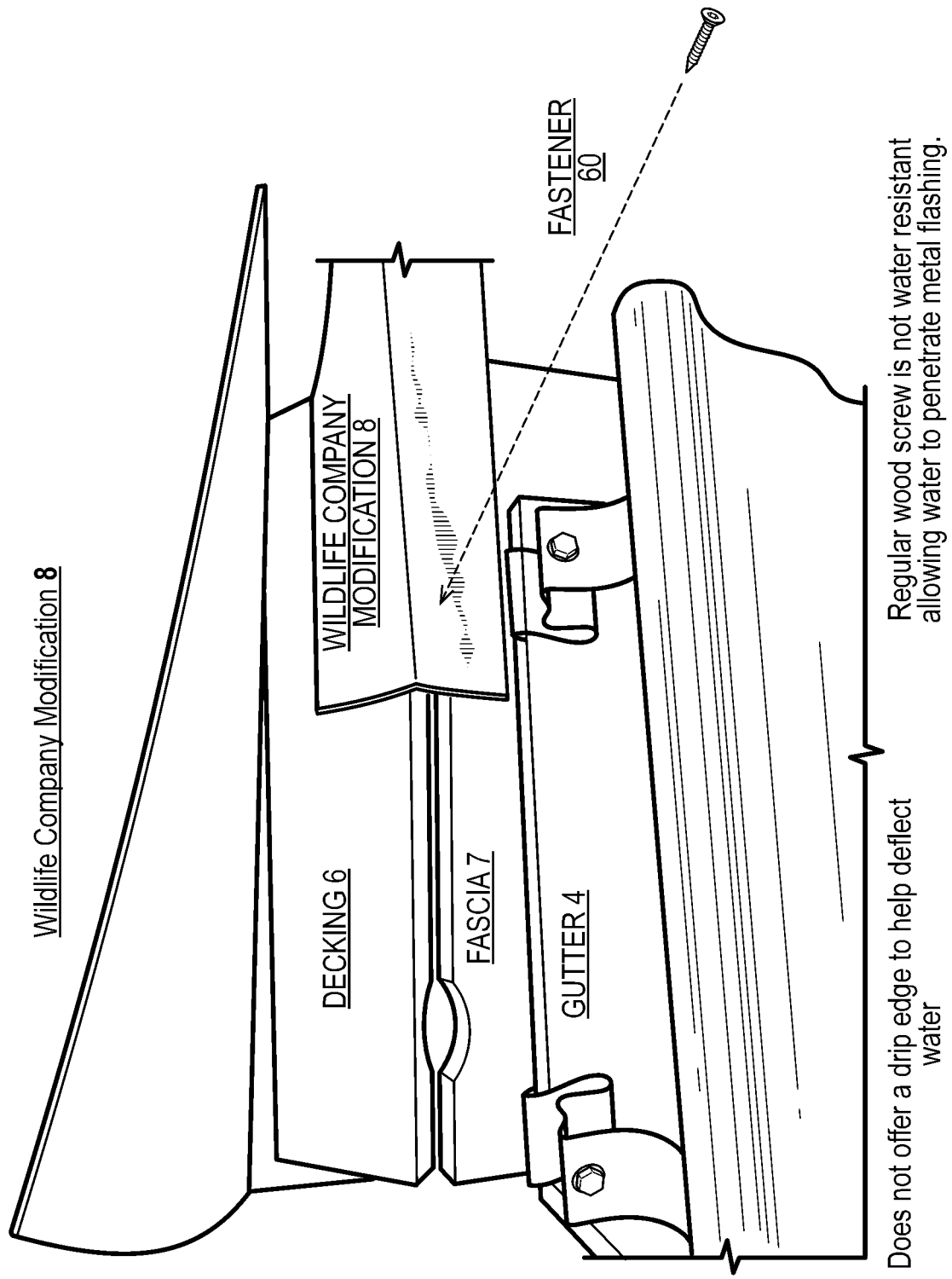
FIG. 3 shows a "Wildlife Company Modification" 8 Configuration, in which a flashing length is added (in this case a drip edge is not present) and is attached to the fascia in an attempt to make it rodent proof. In this configuration a regular wood screw is used to fasten the flashing to the fascia, which allows water to penetrate the metal flashing. As may also be seen the absence of a drip edge is disadvantageous as there is no drip edge to divert water into the gutter.

To address such rodent entry issues, configurations such as that shown in FIG. 3 are provided. FIG. 3 shows a generic "Wildlife Company Modification" 8 configuration, in which a wildlife company called in to address wildlife instructions adds a flashing configuration (in this case a drip edge is not present) which is attached to the fascia in an attempt to make it rodent proof. In this configuration a regular wood screw is used to fasten the flashing to the fascia, which allows water to penetrate the metal flashing.

Experience has shown that in the pest control industry, pest control companies install a metal flashing to cover the construction gap. It is rodent proof but is an eye sore and doesn't serve as proper drip edge.

The Applicant's Drip Edge Configuration 10 has holes in the fascia-facing face which allows the drip edge to be screwed from the face using screws with rubber washers for a water proof seal just as screws typically used on a metal roof. Applicant's Drip Edge Configuration 10 is also galvanized steel and is flexible enough to cut and bend for proper installation to have rodent proof inside and outside corners. The Applicant's Drip Edge Configuration 10 will give consumers a do it yourself option or the option to hire a professional to install. Roofers would have the option to use this product to rodent proof the home while installing a new roof.

Applicant's Drip Edge Configuration 10 also is associated with a novel Roof Return Configuration 100 to seal the construction gap where the soffit meets the shingles. There is sometimes a gap where some carpenters leave so that the wood doesn't soak up water from wet shingles. Applicant's Roof Return Configuration 100 should be installed on every return to prevent rodent entry. Applicant's Drip Edge Configuration 10 also has the option for venting in the rare occasion where a house has no soffit or additional venting is required.

More Detailed Description

This description will be in two sections, relating to the following two components:
Drip Edge Configuration 10 (aka Drip Edge System 10)
Roof Return Seal Configuration 100 (aka Roof Return Seal System 100)
Drip Edge Configuration 10

The Drip Edge Configuration 10 (aka Drip Edge System 10) is shown in FIGS. 4, 5, 6, 7, 8A-D, 9, 10, and 11. Referring generally to these figures, it may be seen that Applicant's Drip Edge Configuration 10 includes the following elements: Deck Facing Section 20
Over Hanging Section 30
Fascia Facing Section 40
Drip Edge Section 50
Fastener 60

In one configuration, the elements 20, 30, 40, and 50 are all provided by the use of an elongate piece single piece of flat metal stock that is formed into a cross section which includes elements 20, 30, 40, and 50. This bending process is similar to the formation of elongate gutters. Referencing FIG. 5, this forms a Drip Edge Length 15 which includes or comprises the elements 20, 30, 40, and 50. These drip edge lengths 15 can be of various lengths and gauges, including but not limited to four feet long and of the gauge 31 (approximately $7/640$ inch). In this embodiment, the Applicant's Drip Edge Configuration 10 includes a Drip Edge Length 15 (which includes the elements 20, 30, 40, and 50) and also includes a Fastener 60. Also part of the configuration can include a Vented Drip Edge Length 65 for use along with the Drip Edge Length 15 as noted later.

Figure 4:
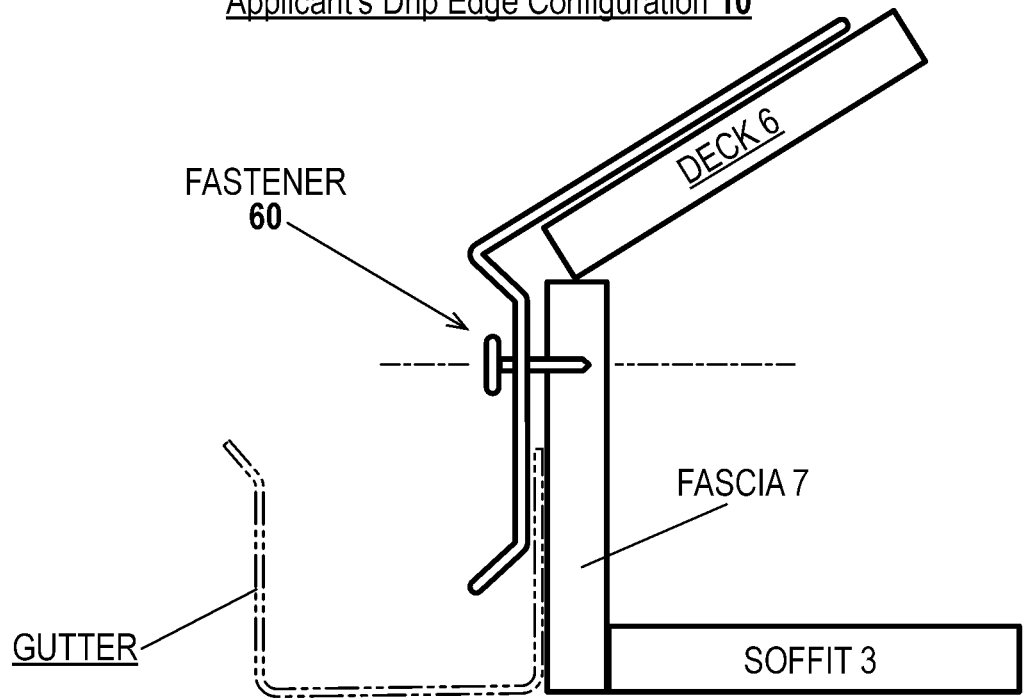
FIG. 4 shows the Applicant's Drip Edge Configuration 10 attached in place. As may be seen a fastener 60 assembly is used to fasten the configuration to the roof fascia 7, instead of to the roof deck 6. This fastener (screw, or the like) 60 fastens the drip edge from the "front"; said another way the fastener 60 passes through the fascia facing section 30 from the outside, and fastens the fascia facing section 30 to the roof fascia 7. Note also soffit 3.

Reference is now made to FIG. 4, which shows the Applicant's Drip Edge Configuration 10 attached in place. As may be seen a fastener 60 is used to fasten the configuration to the fascia, instead of to the deck. This is an important feature. Predrilled holes are preferred.

Figure 5:
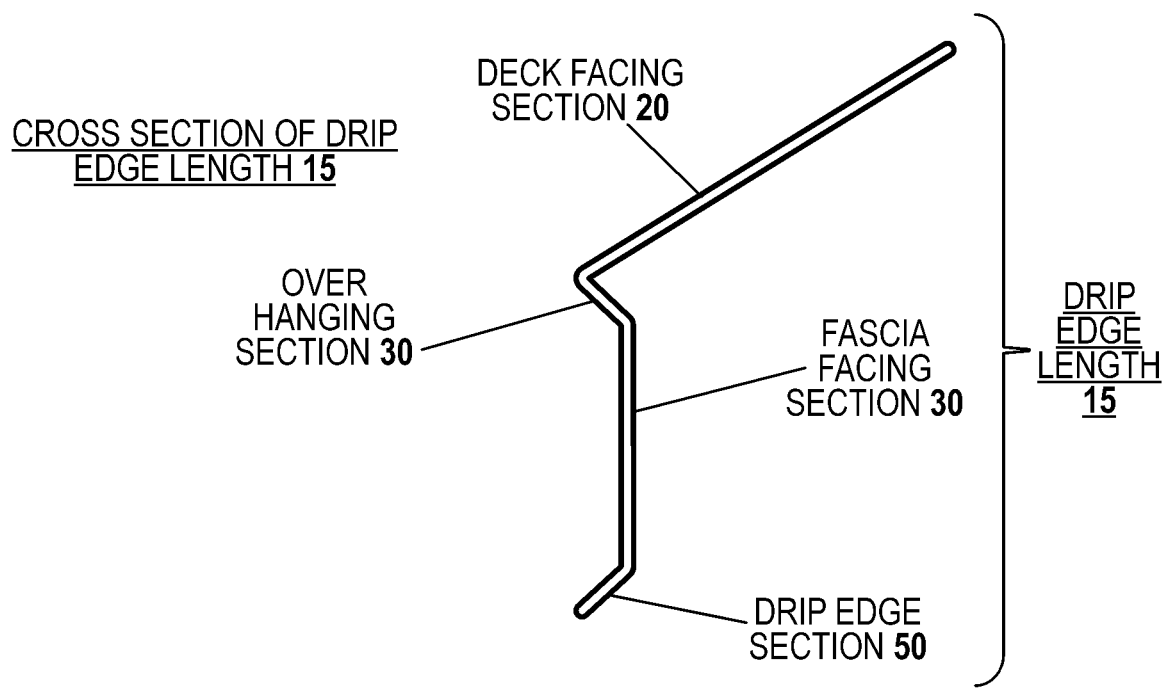
FIG. 5 shows the Applicant's Drip Edge Configuration 10 in isolation. As may be seen, the configuration includes a deck facing section 20, an overhanging section 30, a fascia facing section 40, and a drip edge section 50.

Reference is now also made to FIG. 5, which shows the Applicant's Drip Edge Configuration 10 in isolation. As may be seen, the configuration includes a drip edge length 15 itself including a deck facing section 20, an overhanging section 30, a fascia facing section 40, and a drip edge section 50.

The deck facing section 20, when installed, has its underside (one of its primary planar surfaces) facing a portion of the upper surface of the supporting deck, and its rearward edge being a free edge. Various planar elements such as tar paper or the like could be intermediate the deck and the undersurface of the deck facing section, but they are still facing each other.

The overhanging section 30 extends from the lower edge of the deck facing section and is configured to "angle back" from the forward edge of the deck facing section as shown in FIGS. 8A-8D.

The fascia facing section 40 is configured to have its underside (one of its primary planar surfaces) facing the exposed vertical fascia surface as shown in FIG. 4. It extends from the lower edge of the overhanging section 30. Predrilled holes in this are preferred in order to attach the fascia facing section 40 to the roof fascia, with the fastener passing through the fascia facing section and attaching the fascia facing section relative to said roof fascia portion.

The drip edge section 50 extends at an angle outward from the lower edge of the fascia facing section 30, and terminates in a free edge. Thus, the elongate drip edge length covers the elongate gap and discourages pests from accessing the elongate gap and entering therethrough. This is an important feature of an invention herein.

Figure 6:
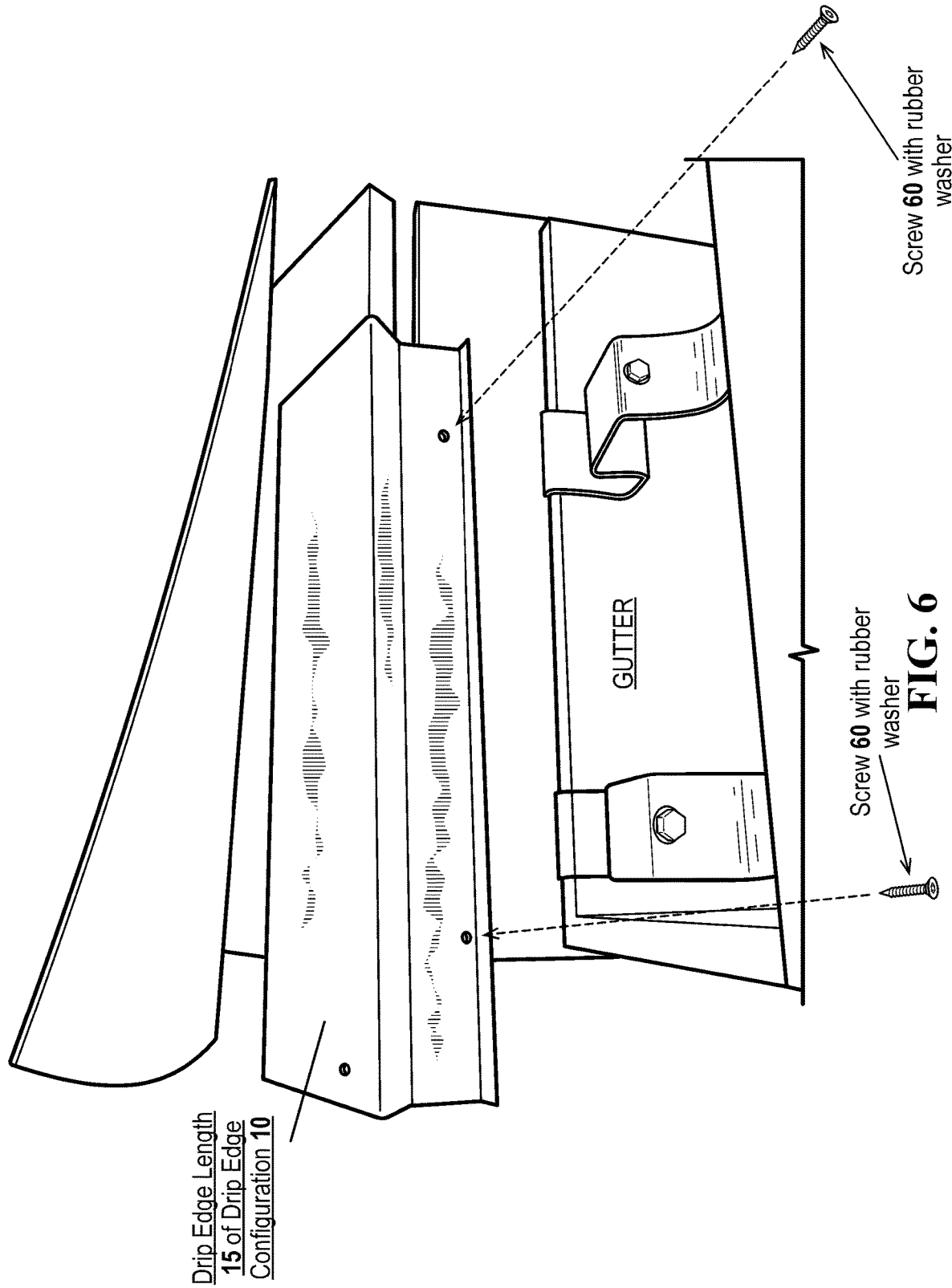
FIG. 6 shows a drawing of Applicant's Drip Edge Configuration 10. As may be seen, the rodent proof drip edge is screwed from the front, making it impossible for rodents to enter. The construction is galvanized metal which is impossible for rodents to chew through. A drip edge is included to deflect water. This configuration has the ability to go over existing drip edges or over an aluminum fascia strip. The rodent proof drip edge may be trimmed and wrapped with specific installation instructions along inside and outside corners as well as ends. Pre-drilled holes may be provided for easy and appropriate installation of the fasteners. A fastener assembly 60 such as a metal screw with a rubber washer is used to keep water out.
Figure 7:
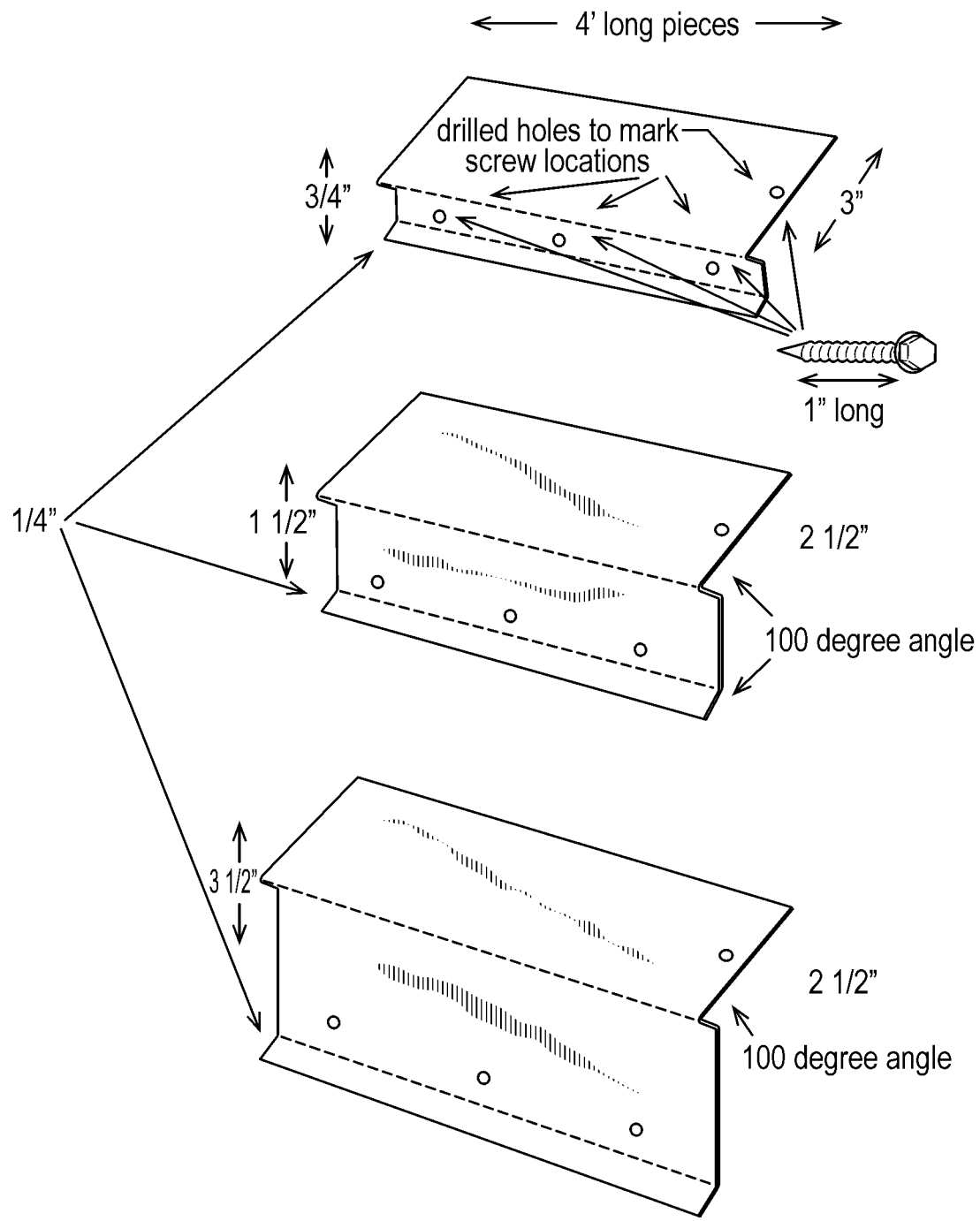
FIG. 7 shows three different available cross sections of the Drip Edge Length 15 of applicant's Drip Edge Configuration 10. Note that 31 or other gauge galvanized metal may be used. Also note that the measurements may slightly change. In this drawing, it may be seen that 4 foot pieces of Edge Lengths 15 are shown.

A fastener 60 is used to fasten the fascia facing section 40 of the Drip Edge Length 15 to the fascia as shown in, for example, FIGS. 4, 6, and 7.

FIG. 6 shows Applicant's Drip Edge Configuration 10. As may be seen, the rodent proof drip edge is screwed from the front, making it impossible for rodents to enter. The construction is galvanized metal which is impossible for rodents to chew through. A drip edge is included to deflect water. This configuration has the ability to go over existing drip edges or over an aluminum fascia strip. The rodent proof drip edge may be trimmed and wrapped with specific installation instructions along inside and outside corners as well as ends. Pre-drilled holes may be provided for easy and appropriate installation. A screw fastener assembly 60 with a rubber washer around the shaft of the screw is used to keep water out.

FIG. 7 shows three different available cross sections of Applicant's Drip Edge Configuration 10.

Figure 8A:
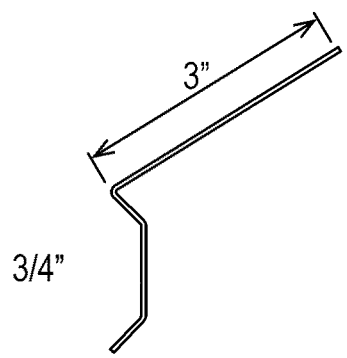
FIG. 8A-C show dimensions of the three different available cross sections of the Drip Edge Length 15 of Applicant's Drip Edge Configuration 10 shown in FIG. 7.
Figure 8B:
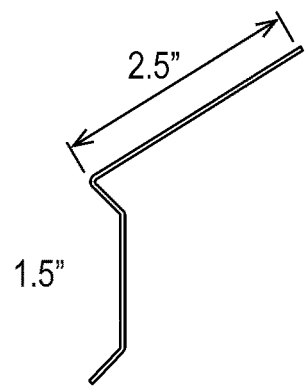
Figure 8C:
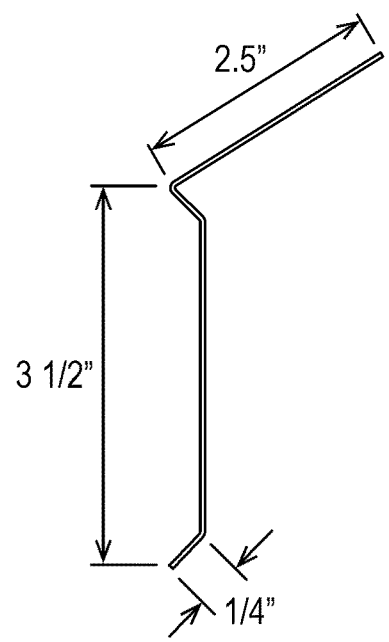

FIG. 8A-C show dimensions of the three different available cross sections of drip edge lengths 15 of Applicant's Drip Edge Configuration 10 shown in FIG. 7.

Figure 8D:
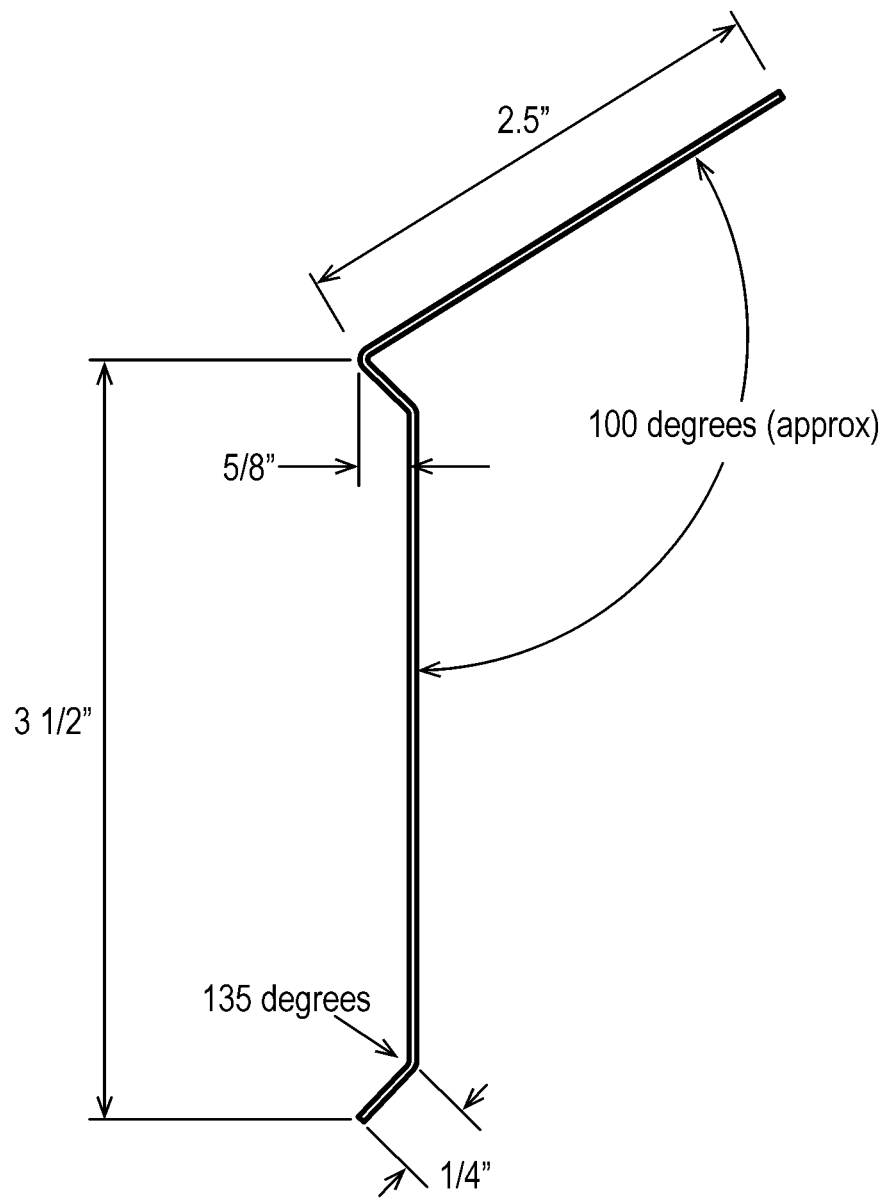
FIG. 8D shows more detailed dimensions of the cross sections of the Drip Edge Length 15 of Applicant's Drip Edge Configuration 10 shown in FIG. 8C. The ridge at which the top section and the overhanging section meet extends approximately ⅝" in front of the plane of the fascia.

FIG. 8D shows more detailed dimensions of the cross sections of drip edge lengths 15 of Applicant's Drip Edge Configuration 10 shown in FIG. 8C.

Figure 9A:
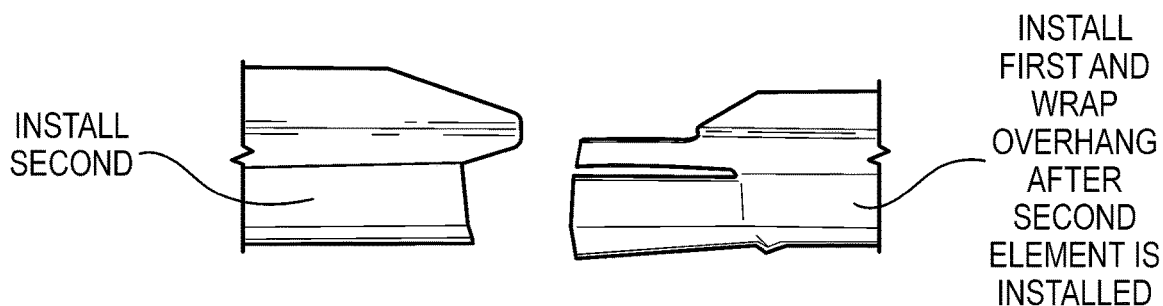
FIGS. 9A-C show the manner in which outside corners are covered with the edge lengths 15 of the Drip Edge Configuration 10.
Figure 9B:
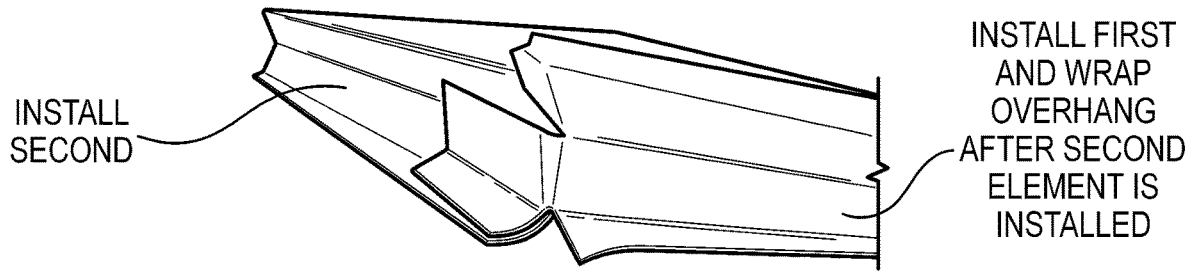
Figure 9C:
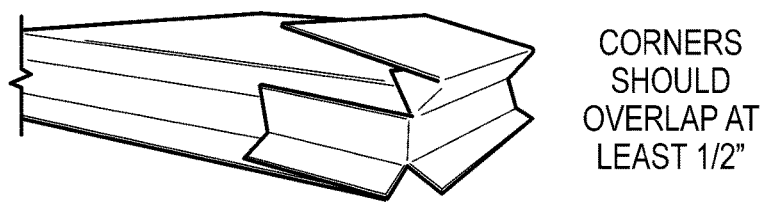

FIGS. 9A-9C show the manner in which outside corners are covered with the drip edge lengths 15 of the Drip Edge Configuration 10. Note that it is suggested that the corners should overlap at least ½ (0.5) inches.

FIG. 10 shows the manner in which inside corners are covered with the Drip Edge Configuration 10.

Figure 11:
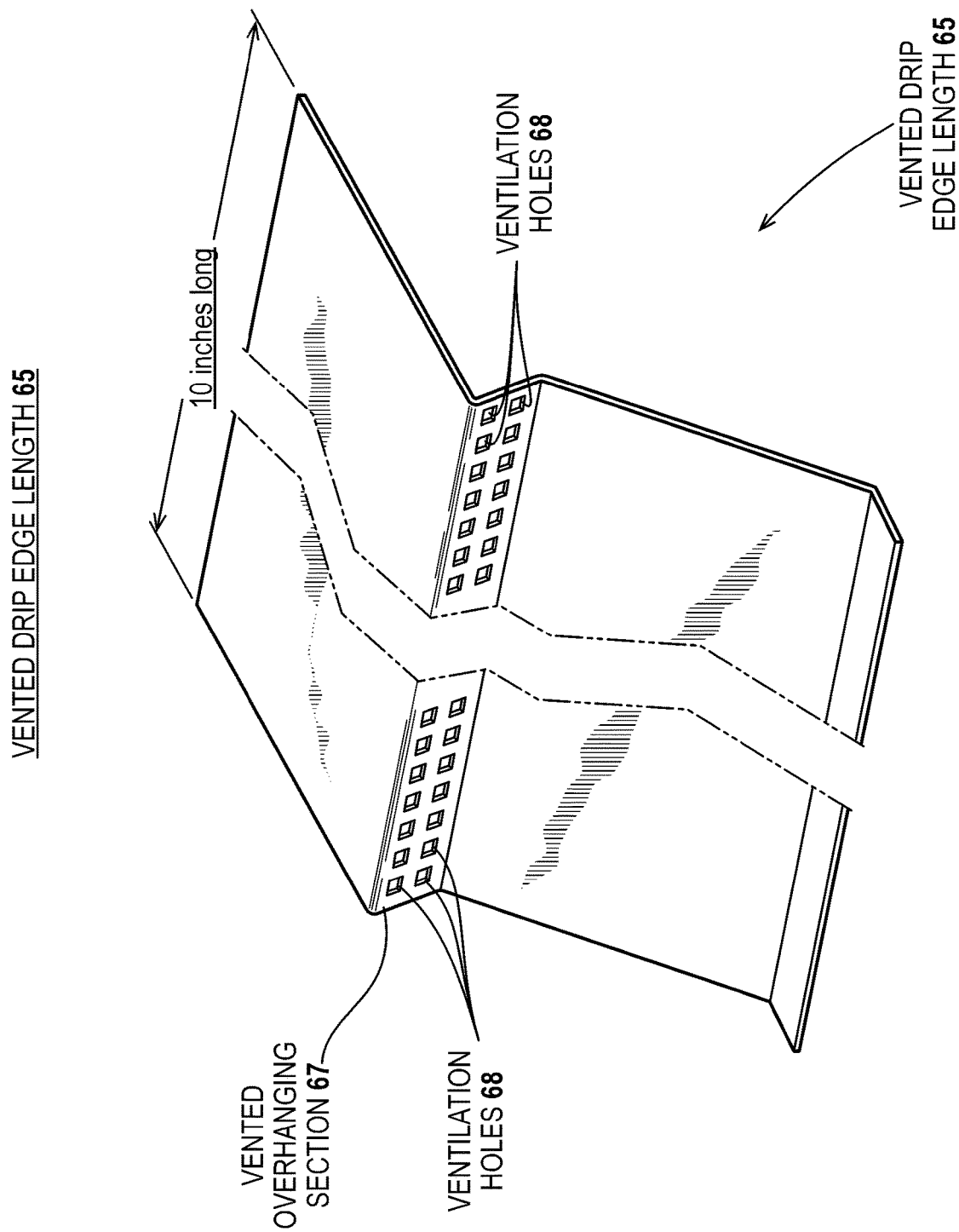
FIG. 11 shows the use of ventilation holes 68 which may also be included in Applicant's Drip Edge Configuration 10. This is done by providing a shorter (e.g. 10 inches long) vented drip edge length 65. This drip edge length 65 is similar to Drip Edge Length 15 in cross section except that the drip edge section in the overhanging section 67 is vented with multiple ventilation holes 68 instead of being unvented in the Drip Edge Length 15. This section 67 is made in one configuration of 31 gauge thickness metal sheeting, and is installed a minimum of every 6 feet along the elongate length of the installation. It should be understood that this venting may be used when the soffits of the structure are not vented, and the configuration of the venting may be similar to that used in conventional soffit venting. Note that pre-drilled holes are not shown in this drawing, but they should be used in a preferred embodiment, being spaced similar to the holes shown in the larger drip edge configuration 7 in FIG. 7. In one embodiment, three holes are used.

FIG. 11 shows the use of ventilation holes which may also be included in Applicant's Drip Edge Configuration 10. This is done by providing a shorter (e.g. 10 inches long) vented drip edge length 65. This drip edge length 65 is similar to Drip Edge Length 15 in cross section except that the drip edge section in the overhanging section 67 is vented with multiple ventilation holes 68 instead of being unvented in the Drip Edge Length 15. This section 67 is made in one configuration of 31 gauge thickness metal sheeting, is ten inches long, and is installed a minimum of every 6 feet along the elongate length of the installation. It should be understood that this venting may be used when the soffits of the structure are not vented, and the configuration of the venting may be similar to that used in conventional soffit venting. The vent holes 68 should in one preferred embodiment be no larger than ⅛" by ⅛". The holes can be round or square. As many holes as possible should be manufactured into the vent.

Roof Return Seal Configuration 100

The Roof Return Seal Configuration 100 is shown in FIGS. 12, 13A-B, and 14. It includes a return length 102, fasteners 104, and adhesive 106. The return length 102 includes a shingle facing section 106 and a soffit and/or fascia facing section 107.

As noted above, the Roof Return Seal Configuration 100 is configured to be installed over a construction gap to prevent wildlife from entering. It should be screwed to the soffit and/or fascia, while silicone should be used a adhere to the shingles.

Figure 12:
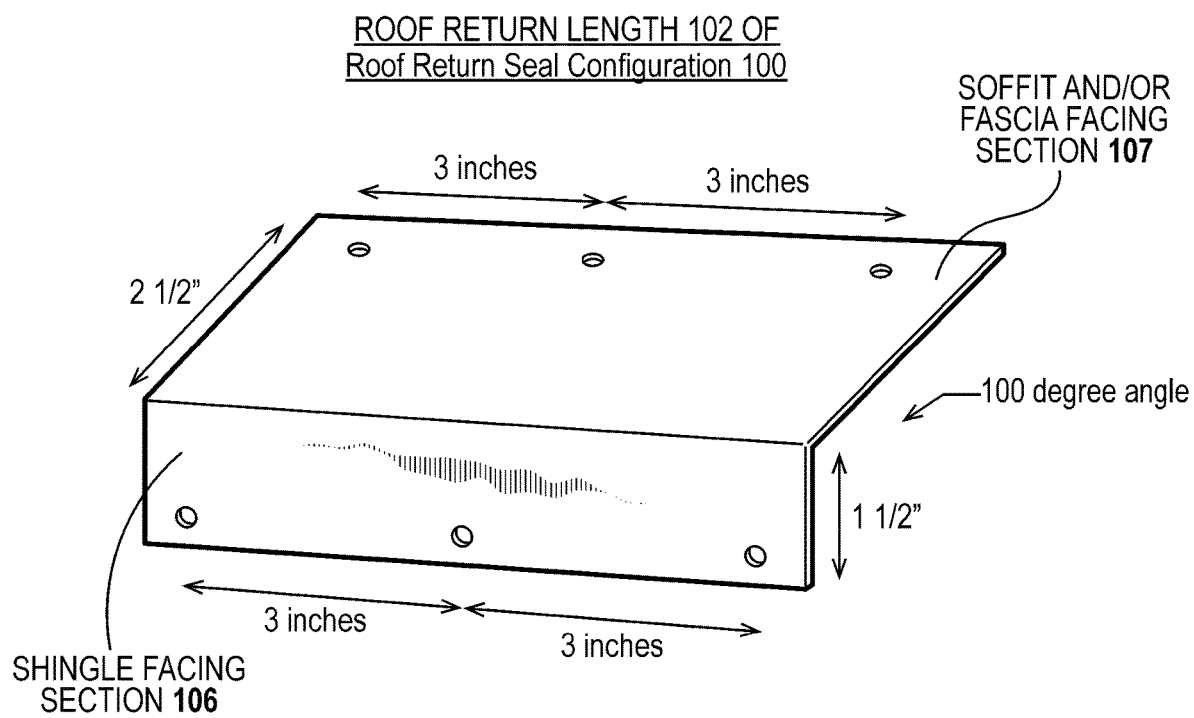
FIG. 12 shows an example Roof Return Seal Configuration 100. Such configurations can come in lengths of 24 inches, and can be screwed and/or siliconed to the soffit and/or roofing deck, and the holes can be three inches apart.

FIG. 12 shows an example Roof Return Seal Configuration 100. Such configurations can come in lengths of 24 inches, and can be screwed and/or siliconed to the soffit and/or fascia. As may be seen, the item shown has dimensions of 2½ for the longer flange and 1½ for the shorter flange. An alternative is a size being 1½ and 1 inch. The shorter flange (shingle facing section 106), is the flange that is placed in contact with the roof shingles. The longer flange (soffit and/or fascia facing section 107) covers the gap and attaches to a roof soffit portion and/or roof fascia portion. Materials for 100 are similar to those used for the Drip Edge Length 15.

Figure 13A:
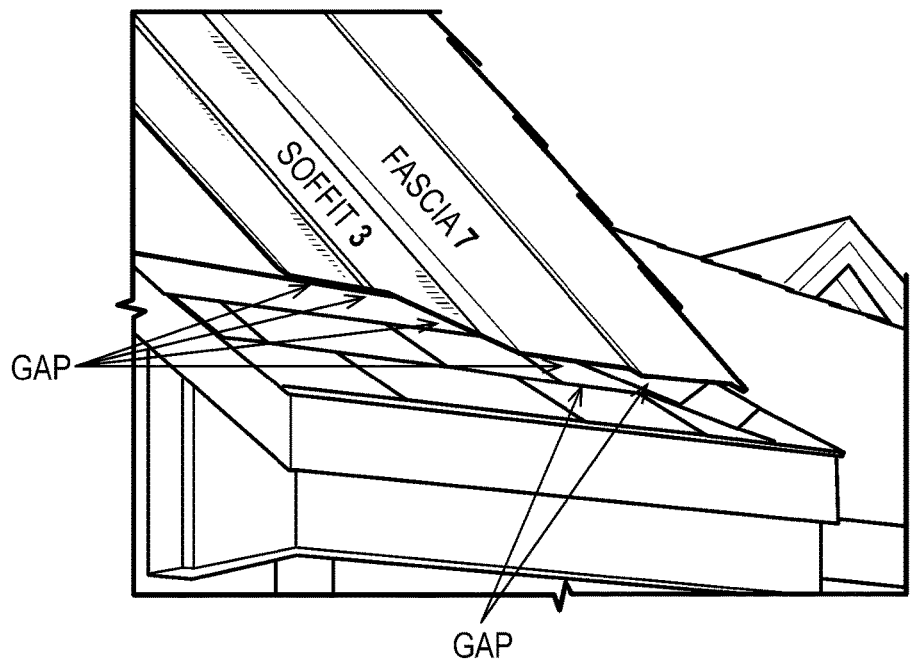
FIGS. 13A and 13B are similar drawings of a roof configuration.
Figure 13B:
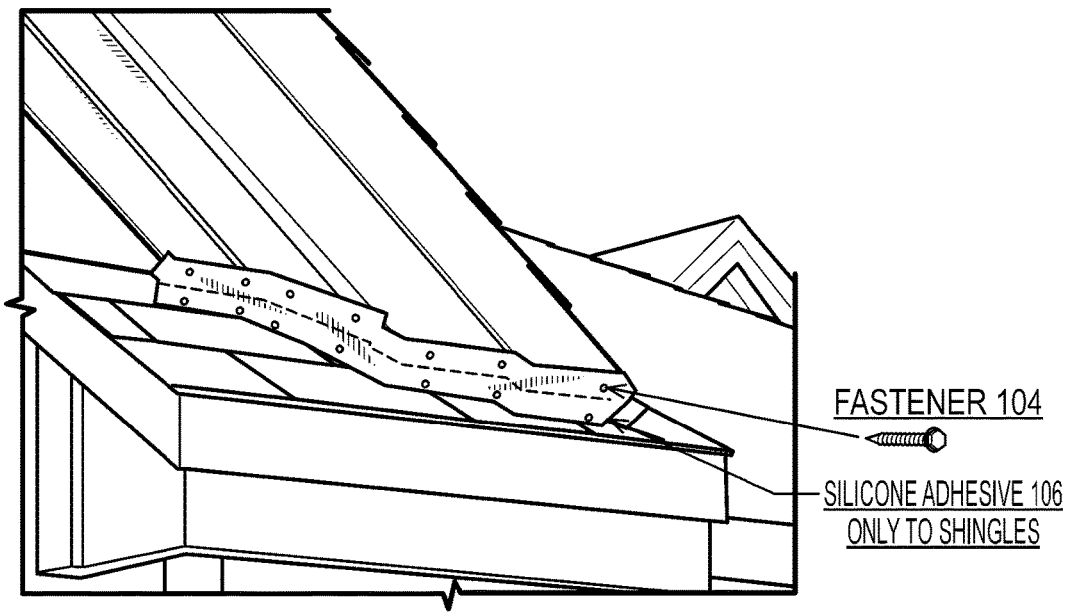

FIGS. 13A and 13B are similar drawings of a roof configuration. FIG. 13A shows a gap underneath the soffit and fascia of the roof, and above flashing or roofing shingles. FIG. 13B shows a return seal in place, covering the gap that was shown in FIG. 13A. It should be understood that in this figure, the return seal is installed over the construction gap to prevent wildlife from entering. It should be screwed to the soffit and/or fascia, while silicone should be used to adhere to the shingles. Note that there are several bends in the gap shown—the return seals are bent to adapt, with the use of cutting and bending techniques. A screw fastener assembly 104 with a rubber washer around the shaft of the screw is used to keep water out. Note that in this drawing the inclined facia 7 is facing generally toward the viewer, slightly to the right of the viewer. The soffit 3 is hidden somewhat up behind the fascia 7.

Figure 14:
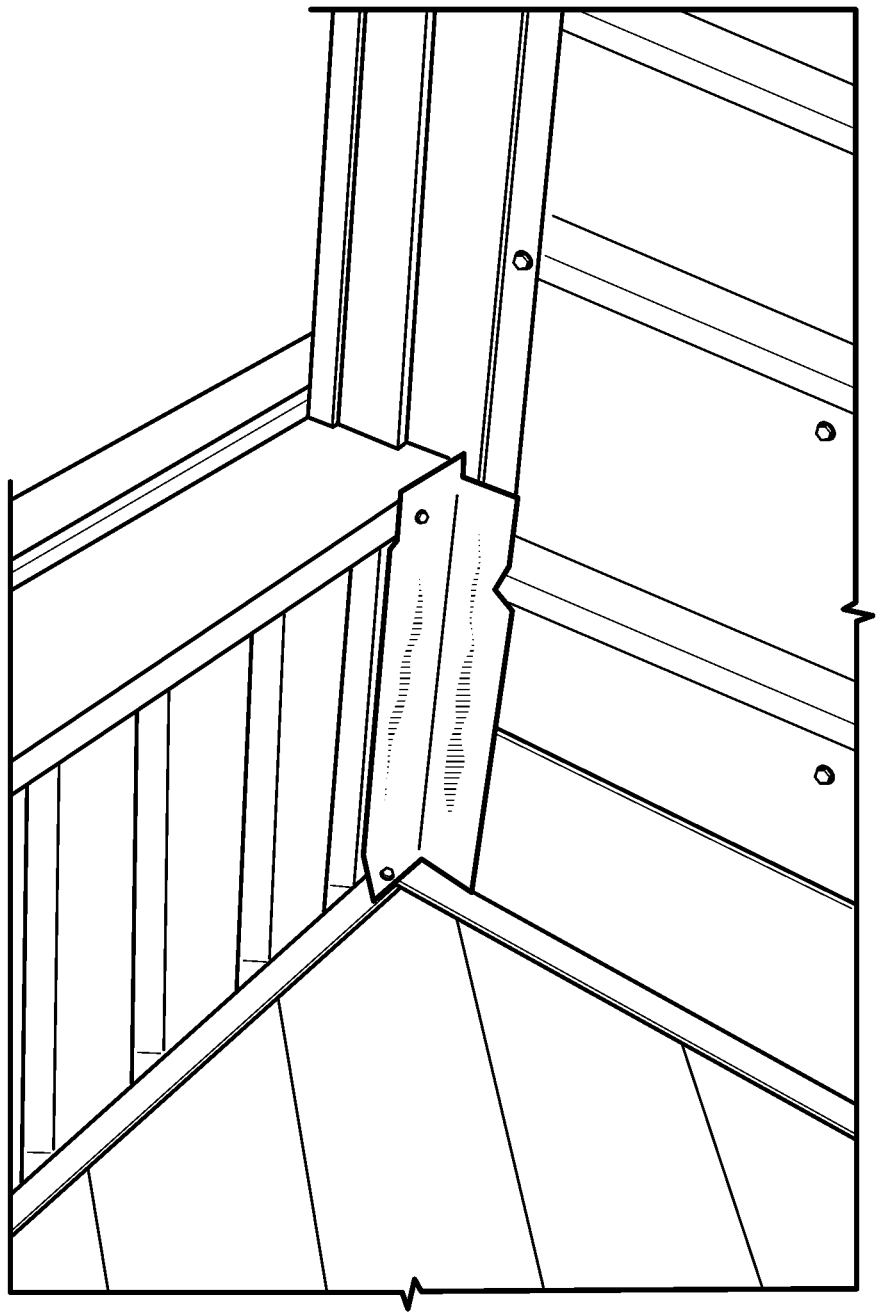
FIG. 14 shows a Roof Return Seal Configuration 100 in place.
Figure 15:
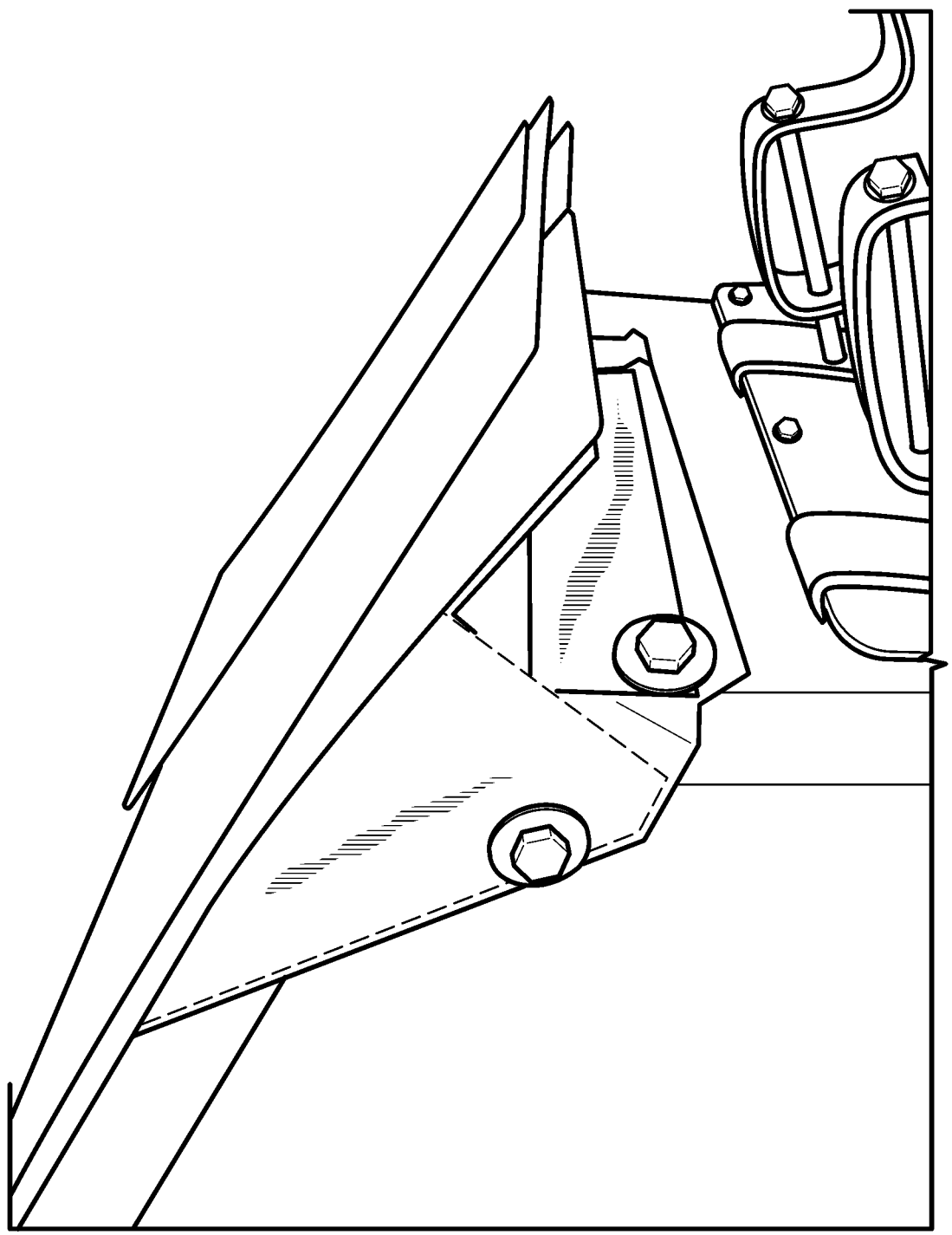
FIG. 15 shows a Drip Edge Configuration 10 installed at the end of the fascia. The dotted line shows a flap which has been cut out of the deck potion of the drip edge and folded approx. 90 degrees so as to wrap around and cover the end of the structure so as to discourage pest entry.
Figure 16A:
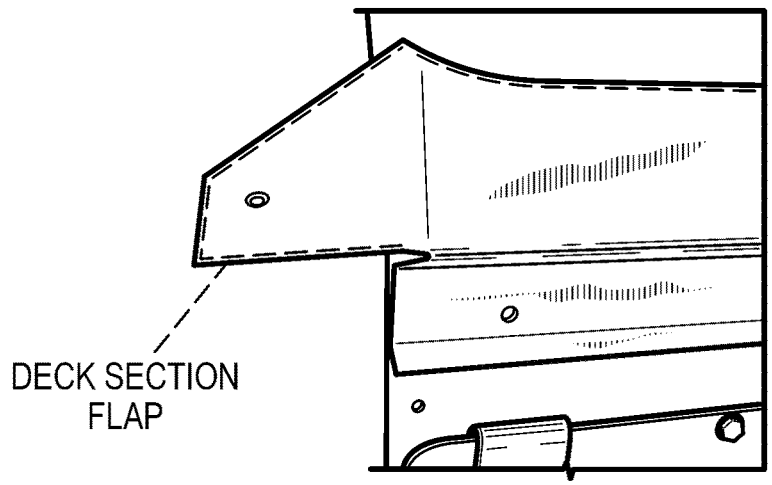
FIGS. 16 A-C show another Drip Edge Configuration 10 installed at the end of the fascia. The dotted line in FIG. 16A shows a deck section flap which has been cut out of the deck portion of the drip edge and can be folded as shown in FIG. 16B approximately 90 degrees so as to wrap around and cover the end of the structure so as to discourage pest entry.
FIG. 16C shows another, second, flap, a fascia facing section flap, which has been cut out of the fascia section of the drip edge and can be folded back approximately 90 degrees so as to wrap around and cover the end of the structure so as to discourage pest entry. This fascia facing section flap is shown under the deck section flap shown in FIGS. 16 A-B.
Figure 16B:
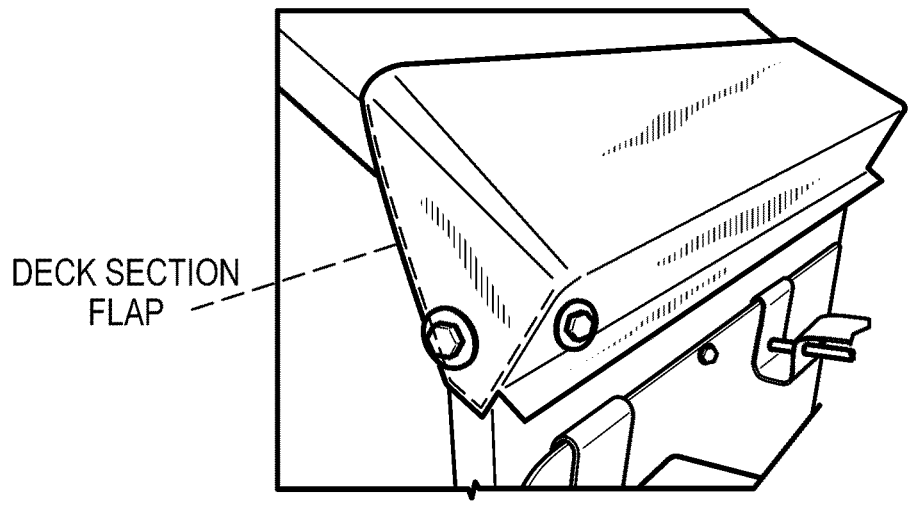
Figure 16C:
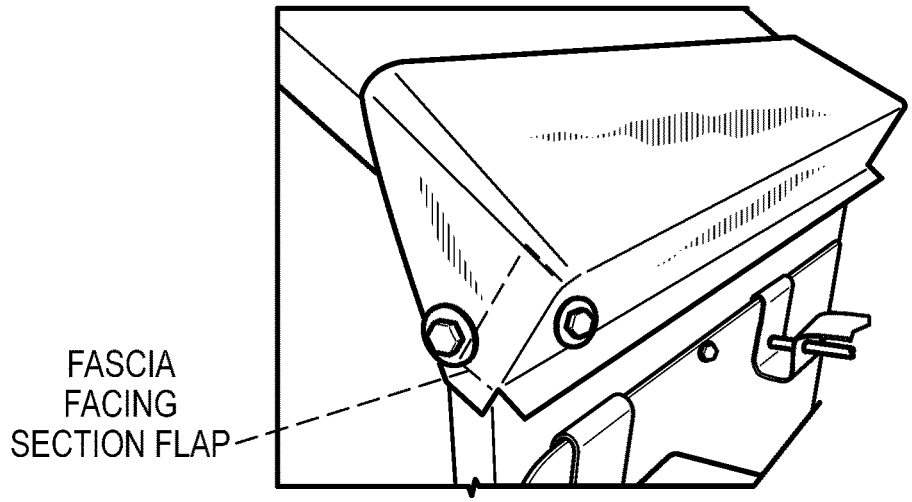

FIG. 14 shows a Roof Return Seal Configuration 100 in place between the soffit and the roof Materials As may be understood, any suitable sheet metal materials may be used to provide the configurations above. The sheet material used may be galvanized metal, aluminum, or the like. Thicknesses and gauges may be selected to fit the application, as long as suitably heavy to discourage the local pest population.

The above products could be in various colors as desired, including but not limited to black.

Advantages

As may be understood, the above-described configuration provides an improvement over the prior art by providing an improved Drip Edge Configuration 10, which has holes in the face which allows the drip edge to be screwed from the face using screws with rubber washers for a water proof seal just as used on a metal roof for a rodent proof solution. Applicant's Drip Edge Configuration 10 is also galvanized steel and is flexible enough to cut and bend for proper installation to have rodent proof inside and outside corners. The Applicant's Drip Edge Configuration 10 will give consumers a do it yourself option or the option to hire a professional to install. Roofers would have the option to use this product to rodent proof the home while installing a new roof.

Applicant's Drip Edge Configuration 10 also is associated with a novel Roof Return Configuration 100 to seal the gap where the soffit meets the shingles. There is sometimes a gap where some carpenters leave so that the wood doesn't soak up water from wet shingles. Applicant's Roof Return Configuration 100 should be installed on every return to prevent rodent entry. Applicant's Drip Edge Configuration 10 also has the option for venting in the rare occasion where a house has no soffit or additional venting is required.

Conclusion

Various modifications and variations can be made in the present invention without departing from the spirit or scope of the invention.

From the foregoing, it will be seen that this invention is one well adapted to obtain all the ends and objects herein set forth, together with other advantages which are obvious and which are inherent to the structure.

It will be understood that certain features and sub combinations are of utility and may be employed without reference to other features and sub combinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A multi-component device for discouraging pest entry into a dwelling having a roof, said roof including a roof deck portion including a substantially planar outer surface portion, and a roof fascia portion, said roof deck portion and said roof fascia portion defining an elongate gap therebetween, said gap lying generally along an elongate horizontal axis; said device comprising:

A) an elongate drip edge length having a substantially consistent transverse cross section, said drip edge length comprising:

1) an elongate substantially planar deck facing section defining two opposing primary planar surfaces, said deck facing section configured to have a portion of one of said primary planar surfaces facing a portion of said roof deck portion such that said one primary planar surface is substantially parallel to said planar outer surface portion of said roof deck portion, said planar deck facing section also including a rearward elongate free edge and an opposing forward edge;
2) an elongate substantially planar overhanging section, said overhanging section extending from said forward edge of said deck facing section and configured to angle back from it towards said roof fascia to a rearward overhanging section edge;
3) an elongate substantially planar fascia facing section attached to an edge of said overhanging section, said fascia facing section configured to have a portion of one primary planar surface facing said roof fascia portion; and
4) an elongate substantially planar drip edge section, said drip edge section configured to extend at an angle outward from the lower edge of said fascia facing section, and terminating in an elongate free edge; and B) a fastener being elongate,
said fastener including a portion passing through said fascia facing section and attaching said fascia facing section relative to said roof fascia portion,
said elongate drip edge length covering said elongate gap and discouraging pests from accessing said elongate gap and entering therethrough; and C) an elongate gutter having a substantially consistent transverse cross section, said transverse cross section being generally U-shaped and defining an upwardly facing open channel, such that said elongate free edge of said drip edge of said fascia facing portion is positioned within said gutter opening, and wherein said elongate fastener passes through said fascia facing portion at a level which is vertically higher than said gutter, such that said fastener does not engage said gutter but is positioned vertically above it, and such that said fastener holds said fascia facing portion in place such that a portion of said gutter below said fastener is captured between said fascia facing portion and said roof fascia portion.

2. The multi-component device for discouraging pest entry as claimed in claim 1, such that said portion of said gutter is in planar contact with said fascia facing portion on one side, and such that said portion of said gutter is in planar contact said roof fascia portion on an opposing side.

3. The device as claimed in claim 1, wherein said elongate substantially planar fascia facing section includes pre-drilled holes to allow said fasteners to pass therethrough.

4. The device as claimed in claim 3, wherein said fastener includes a metal screw with a flexible seal element around the metal shaft of said screw to keep water out.

5. The device as claimed in claim 4, wherein said flexible seal element of said fastener assembly is a rubber washer.

6. The device as claimed in claim 1, wherein said fastener includes a metal screw with a flexible seal element around the metal shaft of said screw to keep water out.

7. The device as claimed in claim 6, wherein said flexible seal element of said fastener assembly is a rubber washer.

8. The device as claimed in claim 1, wherein said elongate drip edge length is made of galvanized sheet metal.

9. The device as claimed in claim 1, wherein said elongate drip edge length is bendable for inside or outside corners by use of cutting and folding.

* * * * *